Patented Mar. 1, 1927.

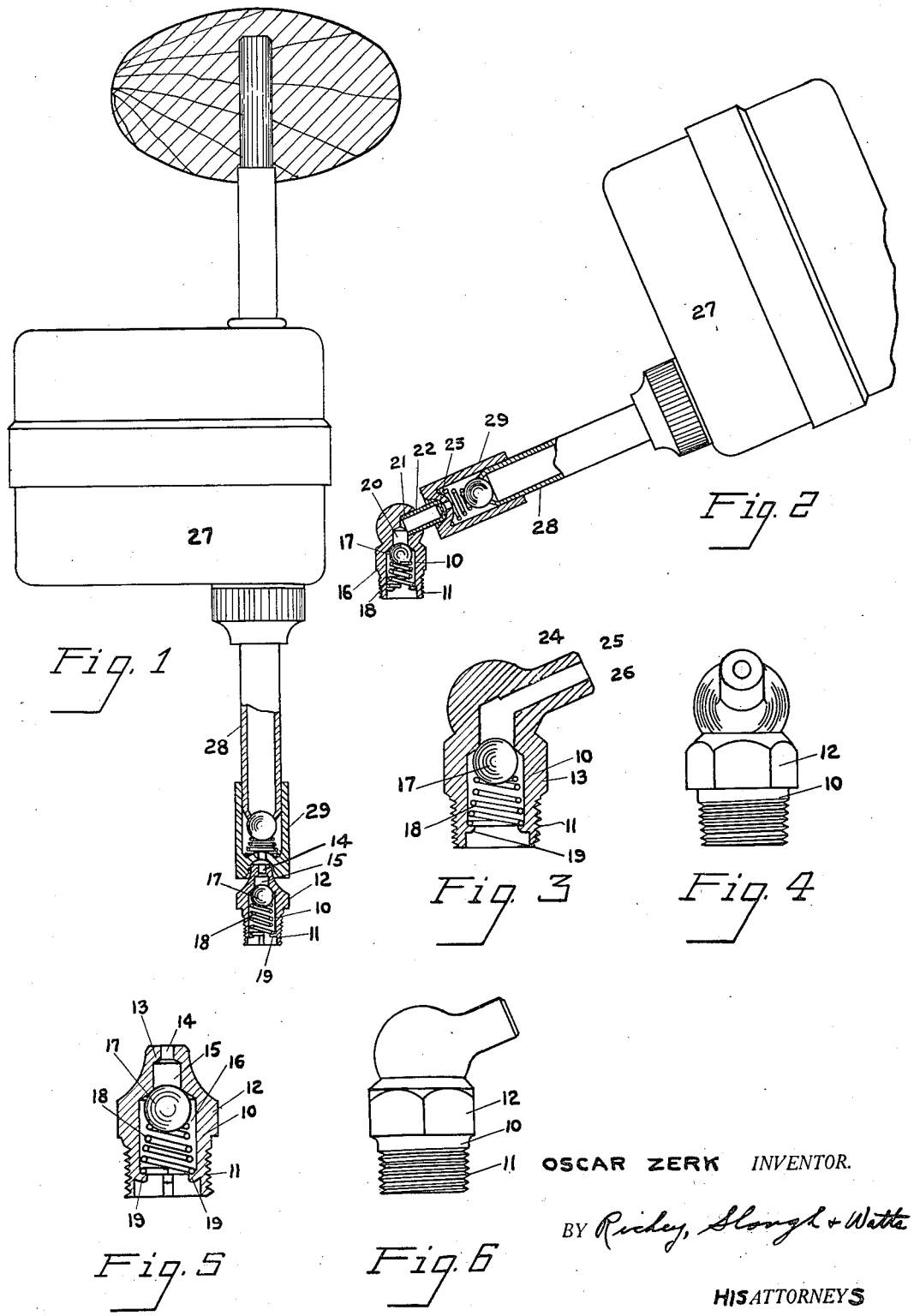

1,619,454

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICANT-RECEIVING NIPPLE.

Application filed July 5, 1923. Serial No. 649,701.

This invention relates to nipples for feeding lubricant to elements to be lubricated.

The main object of my invention is to provide a nipple structure wherein the closure valve is concealed within the nipple reducing the possibility of dirt and grit lodging between the valve and valve seat, and providing a passage through the nipple through which lubricant can be forced by a minimum amount of external pressure.

Another object of my invention resides in providing a nipple with a passage extending therethrough and a self-closing valve intermediate the ends thereof, which valve is opened only by the pressure exerted thereagainst by lubricant while being injected through the passage.

Another object of my invention resides in providing a nipple with an angular passage extending therethrough and providing a self-closing valve for normally closing the passage at its angular junction.

Another object of my invention resides in providing a nipple with an inlet elbow and securing a self-closing valve within the nipple for normally closing a passage through the nipple, the valve being located below the elbow and retained so that it will be opened only by pressure of lubricant thereagainst while being injected through the elbow.

In the drawings Fig. 1 is a side elevation of a lubricant dispensing apparatus, with the outlet connector in section and applied to my improved straight nipple which is shown in section; Fig. 2 is a similar view showing the lubricating apparatus in contact with my improved nipple of the angular elbow type; Fig. 3 is a sectional view of another type of angular nipple; Fig. 4 is a side elevation of the nipple shown in Fig. 2; Fig. 5 is an enlarged sectional elevation of the nipple shown in Fig. 1; and Fig. 6 is a side elevation of the nipple shown in Fig. 3.

Referring to the drawings by characters of reference, I have illustrated three types of nipples each of which has a body portion 10 through which lubricant passes. The outlet ends of the bodies are similar and preferably cylindrical in shape, and the outer wall of each is provided with a spiral thread 11, whereby the nipple may be screwed into a threaded opening in an element to be lubricated. If desired, the outer wall at the outlet end of the bodies may be smooth, and in such case can be pressed into an opening in the element to be lubricated. The outer wall of the bodies, above the threads, are shown formed with hexagonal sides 12, whereby a wrench can be used thereon to insert or remove the nipple from the element to be lubricated. As far as described, the nipples are alike.

In Figs. 1 and 5, the portion of the body of the nipple above the hexagonal portion is circular, and curves inwardly toward the end. This circular portion of the nipple terminates in an end wall 13, which forms a contact face of small diameter against which the lubricant dispensing apparatus is held in contact, to deliver into the nipple. This contact face is bounded by a circular dirt-cutting edge.

The end wall 13 is provided with a centrally located inlet aperture 14 of minimum diameter for the admission of lubricant. This aperture is self-sealing to exclude dirt and retain the lubricant trapped in the nipple. The portion of the nipple within the curved portion of the body is provided with a passage 15, of larger diameter than the aperture 14, and is in open communication therewith. A chamber 16 extends from the passage 15 and is open at the outlet end of the body, this chamber being of larger diameter than the adjoining passage. The aperture, passage, and chamber are in alignment, and form a passage through the body which extends longitudinally, of the axis thereof.

A ball valve 17 is secured within the chamber 16, and is pressed against the inner end of the passage 15 by a coil spring 18. The spring is secured within the chamber by a plurality of lugs 19, broached from the inner wall thereof. The diameter of the ball is larger than that of the passage 15, and the spring provides sufficient pressure to normally hold the ball against the passage where it joins the chamber.

In Figs. 2, 3, 4 and 6 I have shown a different form of nipple in which the passage therethrough is angular, the inlet end of the passage extending at an obtuse angle to the longitudinal axis of the nipple body.

In Figs. 2 and 4 the chamber 16 is the same as that previously described, and a passage 20 of small diameter, extends therefrom in longitudinal alignment. An opening 21 is provided through the side of the end wall of the body, at an obtuse angle to the longitudinal axis of the body. This opening adjoins the outer end of the passage 20, and is in open communication therewith.

A hollow cylindrical inlet elbow 22 is pressed into the opening 21, and is thereby secured to the nipple. The end of the elbow projecting into the body is open, and the other end of the elbow, which projects from the body, is provided with an apertured end wall 23. This end wall provides a contact face against which a lubricant dispensing apparatus is held while injecting lubricant through the nipple. A ball valve 17 is provided within the chamber and extends across the passage 20 where it joins the chamber 16, and a coil spring 18 is secured within the chamber to normally create pressure against the ball so that it closes the passage, as described and shown in the first described type of nipple.

In Figs. 3 and 6, the nipple comprises a similar structure as that described in Figs. 2 and 4, and differs only in that the body is provided with an elbow which is formed as an integral extension 24 which projects at an obtuse angle, from the body of the nipple in place of the inserted elbow. The extension elbow is provided with a passage 25 which is in open communication with the passage 20. The outer end of this elbow is provided with an apertured inlet end wall 26, providing a contact face against which a lubricant dispensing apparatus is maintained while injecting lubricant into the nipple.

The lubricant dispensing apparatus is provided with a container 27 having an outlet nozzle 28 and a connector 29, as shown and described in my application filed Nov. 21, 1922, Serial No. 602,466, but various other types of apparatus, functioning in a similar manner with the nipples, could be used. The connector is constructed to form a leak proof contact with the inlet contact face of the nipples herein described, which functions in the same manner as shown and described in my application filed Nov. 21, 1922, Serial No. 602,465.

This application is a continuation in part of my co-pending applications Serial No. 564,284 filed May 29, 1922, and Serial No. 602,465 filed November 21, 1922.

When the connector of the lubricating apparatus is placed in contact with a nipple and pressure is applied against the container, lubricant will be injected into the nipple and the pressure of the lubricant against the ball valve will force the ball into the chamber, permitting lubricant to be injected through the passage in the nipple and into the element to be lubricated. The coil spring will automatically return the ball to normal position, when pressure thereagainst is released.

Locating the valve within the nipple prevents dirt and grit from lodging between the ball and the seat, and will insure a better closure than when the seat and valve are positioned externally and exposed. The passage through the nipple increasing in diameter from the inlet end toward the outlet end will permit lubricant to be fed through the nipple under a minimum pressure.

Various changes in the details of construction may be made without departing from the spirit of the invention, and the scope of the claims.

What I claim is:—

1. A lubricant nipple comprising an axially bored body, an open lateral projection on said body continuing said bore, and a check valve in the axial portion of said bore.

2. A lubricant nipple comprising a body having an axial bore and a laterally opening bore, an inlet tip driven into said laterally opening bore, and a check valve in said axial bore comprising the sole means for preventing return flow through said nipple.

3. A lubricant nipple comprising a body having an axial bore and a laterally opening bore, an inlet tip in said laterally opening bore, and a check valve in said axial bore comprising the sole means for preventing return flow through said nipple.

4. As an article of manufacture, a fitting for a pressure-contact lubricating system, comprising an axially bored body, an open lateral projection on said body continuing said bore and having an inlet thereto, and a check valve spaced from said inlet and exposed to the pressure of the lubricant over an area greater than that of said inlet.

5. As an article of manufacture, a fitting for forming part of a pressure-contact lubricating system, comprising an axially bored body and an open lateral projection on said body continuing said bore and having an inlet of minimum diameter for admission of lubricant and for forming a self-sealing opening.

6. As an article of manufacture, a fitting for forming part of a pressure-contact lubricating system, said fitting comprising an axially bored body, an open lateral projection on said body continuing said bore and terminating in an end surface defined by a circular dirt-cutting edge.

7. As an article of manufacture, a fitting for forming part of a pressure-contact lubricating system, comprising an axially bored body, an open lateral projection on said body continuing said bore and terminating in an extremity having a contact circle of small area.

8. As an article of manufacture, a fitting for forming part of a pressure-contact lubricating system; said fitting comprising a body member and a separate tip member affixed thereto, said tip member having an end surface defined by a circular dirt-cutting edge.

9. As an article of manufacture, a fitting for a pressure-contact lubricating system, comprising a bored body, and a separate tip member attached thereto and having a bore forming a continuation of the body bore, said tip member having an inlet opening of minimum diameter for the admission of lubricant and for forming a self-sealing opening.

10. As an article of manufacture, a fitting for a pressure-contact lubricating system comprising a bored body and a separate tip member affixed thereto and having a bore forming a continuation of said body bore, said bore having an open outer end, and a valve in said bore exposed to the pressure of the lubricant over an area greater than that of said open outer end.

11. As an article of manufacture, a fitting for forming part of a pressure-contact lubricating system, comprising a bored body and a separate inlet tip affixed thereto and having a bore communicating with the bore of said body, said inlet tip having a contact circle of small area.

12. As an article of manufacture, a fitting for forming part of a pressure-contact lubricating system; comprising an axially bored body and a separate, laterally-projecting, member affixed to said body and having an open bore in communication with said body bore, said member terminating in an end surface defined by a circular dirt-cutting edge.

13. As an article of manufacture, a fitting for forming part of a pressure-contact lubricating system, comprising a bored body and a separate, laterally-projecting, member secured to said body and having an open bore communicating with said body bore, said member terminating in an extremity having a contact circle of minimum area.

14. As an article of manufacture, a fitting for forming part of a pressure-contact lubricating system; comprising an axially bored body and a separate, laterally-projecting, member affixed to said body and having an open bore in communication with said body bore, the bore in said member having an inlet of minimum diameter for the admission of lubricant.

15. As an article of manufacture, a fitting for forming part of a pressure-contact lubricating system, comprising a bored body and a separate, laterally-projecting, member affixed to said body, said member having an inlet opening and a bore in communication with said body bore, and a check valve spaced from the inlet end of said fitting and exposed to the pressure of the lubricant over an area greater than the area of the inlet opening.

In testimony whereof I hereunto affix my signature this 3d day of July, 1923.

OSCAR ZERK,
*Now by Judicial Change of Name Oscar Ulysses Zerk.*